US006969052B2

(12) United States Patent
Korzeniowski

(10) Patent No.: US 6,969,052 B2
(45) Date of Patent: Nov. 29, 2005

(54) AIR ASPIRATOR-MIXER

(76) Inventor: Jan A. Korzeniowski, #320, 7930 Bowness Road N.W., Calgary Alberta (CA), T3B 0H3

( * ) Notice: Subject to any disclaimer, the term of this patent is extended or adjusted under 35 U.S.C. 154(b) by 0 days.

(21) Appl. No.: 10/316,932

(22) Filed: Dec. 12, 2002

(65) Prior Publication Data

US 2004/0113288 A1 Jun. 17, 2004

(51) Int. Cl.[7] .................................................. B01F 3/04

(52) U.S. Cl. ................ 261/76; 261/79.2; 261/DIG. 56; 366/138; 366/163.2

(58) Field of Search ........................... 261/76, 77, 79.2, 261/DIG. 56, DIG. 75; 366/138, 163.2

(56) References Cited

U.S. PATENT DOCUMENTS

| | | | | | |
|---|---|---|---|---|---|
| 2,183,561 | A | * | 12/1939 | Hamblin | 261/76 |
| RE21,416 | E | * | 4/1940 | Sargent | 417/159 |
| 2,424,654 | A | * | 7/1947 | Gamble | 48/189.4 |
| 3,271,304 | A | * | 9/1966 | Cox et al. | 210/621 |
| 3,587,976 | A | * | 6/1971 | Jacuzzi | 601/167 |
| 3,855,367 | A | * | 12/1974 | Webb | 261/77 |
| 4,634,560 | A | * | 1/1987 | Eckert | 261/76 |
| 4,992,216 | A | * | 2/1991 | Saita et al. | 261/122.1 |
| 5,057,230 | A | * | 10/1991 | Race | 210/758 |
| 5,514,267 | A | * | 5/1996 | Machiya et al. | 210/170 |
| 5,935,490 | A | * | 8/1999 | Archbold et al. | 261/76 |
| 5,951,922 | A | * | 9/1999 | Mazzei | 261/36.1 |
| 6,623,154 | B1 | * | 9/2003 | Garcia | 366/163.2 |

* cited by examiner

*Primary Examiner*—Scott Bushey
(74) *Attorney, Agent, or Firm*—Thomas E. Malyszko

(57) ABSTRACT

A single port venturi device is provided for aeration of wastewaters containing suspended solids. The device has a non-obstructive design which prevents attachment or accumulation of suspended solids, and promotes even air distribution for efficient aspiration of air and mixing of air and wastewater. The device has provisions for adjustment of the venturi throat size, for protection of the throat from wearing out, for enhancing air and wastewater mixing capabilities, and for flushing of the solids accumulated in the air entrance.

20 Claims, 3 Drawing Sheets

AIR ASPIRATOR-MIXER

FIELD OF THE INVENTION

This invention relates to a process for air aspiration and mixing with fluid in a closed conduit, in particular with the use of a venturi means.

BACKGROUND OF THE INVENTION

A variety of gas/fluid or fluid/fluid mixing devices have been devised wherein a venturi is employed with different types of air or fluid injectors and mixers. The prior art devices are predominantly applicable to small fluid flows containing suspended solids of a relatively small size or no suspended solids at all. The devices can mix a fluid with another fluid, or a gas (typically air) with a fluid. They are predominantly applicable to treatment systems for water and industrial wastewater, but not to sanitary sewage and industrial wastewaters containing relatively large sized suspended solids. The devices lack the ability of preventing plugging by suspended solids and removal of suspended solids which accumulate in the devices. The devices typically employ a built-in venturi throat of fixed dimension or size which reduces its scope of application, and can not be readily replaced when worn out.

The efficiency of prior art gas or liquid aspiration and mixing with a carrier fluid is low, which results in high energy consumption and initial costs.

It is therefore an object of this invention to overcome the problems of plugging by large sized suspended solids. The present invention lends itself to applications in high fluid flow rates, and has a superior ability of mixing gas or fluid with a carrier fluid, and has a high overall efficiency and low energy demand. Further, a removable inlet constricting liner should increase the present device's operating range and life span.

SUMMARY OF THE INVENTION

The air-aspirator-mixer of the present invention is a device and process for self aspirating air/gas or fluid, and mixing the aspirated medium with a carrier fluid.

The air-aspirator-mixer is a device containing a venturi nozzle, an air inlet chamber, a carrier fluid inlet and a fluid/air mixture outlet. The venturi nozzle and the air inlet chamber of the air-aspirator-mixer may be combined with the carrier fluid inlet and the air/fluid mixture outlet which can be used in alternative arrangements to suit the device application, thus rendering flexibility and adaptability to different operating conditions and performance criteria as shown on FIGS. 1, 2 & 3.

The carrier fluid inlet consists of a short cylindrical section with or without a secondary port for connection of an instrument or flushing connection to the air inlet chamber as shown on FIG. 1.

The carrier fluid inlet can be expanded to include a smaller cylindrical portion, a middle expanding inlet portion, and a longer cylindrical outlet portion with a spiral mixer, all of which are connected together as shown on FIG. 3.

The carrier fluid/air mixture outlet consists of a short cylindrical section with or without a secondary port for attachment of an instrument or flushing connection, as shown on FIG. 1.

The carrier fluid/air mixture outlet can be expanded to include a larger cylindrical portion with a spiral mixer, a middle constricting portion and a smaller cylindrical outlet portion with or without a secondary port for attachment of an instrument or flushing connection as shown on FIGS. 2 & 3.

BRIEF DESCRIPTION OF THE DRAWING FIGURES

Embodiments of the invention will now be described, by way of example only, with reference to the accompanying drawings, wherein.

DESCRIPTION OF EMBODIMENTS OF THE INVENTION

Figure 1:
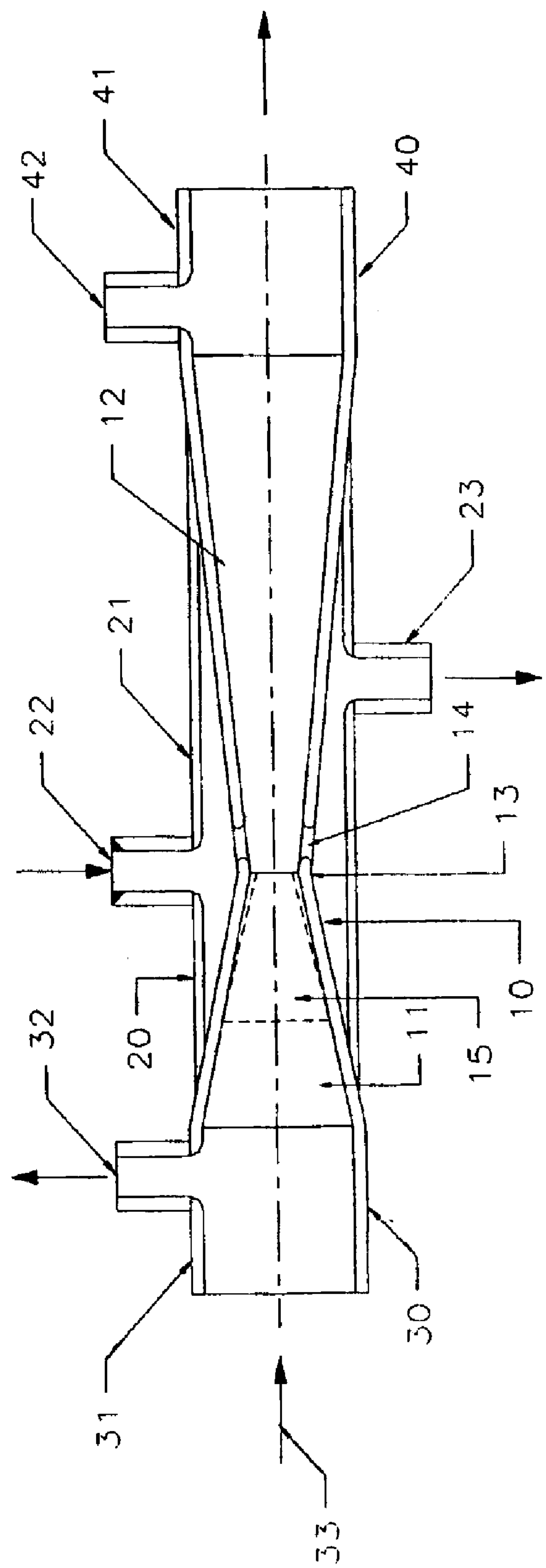
FIG. 1 is a cross-sectional view of an air-aspirator mixer according to a first embodiment of the present invention showing a venturi nozzle.

A first embodiment of the invention is shown on FIG. 1. A venturi nozzle, generally indicated by the reference numeral 10, has a constricting inlet portion 11 and an expanding outlet portion 12, both of which are conically shaped and are connected together by a generally short throat 13. An optional removable inlet constricting liner 15 may be inserted within the inlet portion 11. The liner is provided to obtain a different size of opening at the throat 13 without changing the entire venturi nozzle. The liner also reduces or eliminates wear in the throat area, as discussed later.

The expanding outlet portion 12 consists of a number of circumferentially spaced air inlet apertures 14 which preferably are circular or of another regular shape with rounded edges. The apertures are of adequate size to minimize the inlet air or liquid head losses, are generally evenly spaced about the periphery of the expanding outlet portion 12, and are located close to the throat 13 of the venturi.

An air inlet chamber 20 has an annulus 21 surrounding a longitudinal extent of the venturi 10, and includes a radial air inlet port 22 and a radial air outlet port, or flushing connection, 23. The air inlet port 22 and the flushing connection 23 are preferably rounded at their interfaces with the annulus 21, and the entrance of the air inlet port 22 is also preferably rounded to reduce head losses.

A carrier fluid inlet 30 has a generally cylindrical inlet portion 31 and an optional radial outlet port 32 for an instrument or flushing connection to the air inlet port 22. The fluid entering the inlet 30, designated by arrow 33, typically carries suspended solids of various sizes.

A fluid/air mixture outlet 40 at the opposed longitudinal end of the venturi 10 has a cylindrical outlet portion 41 and an optional radial port 42 for an instrument or flushing connection.

Figure 2:
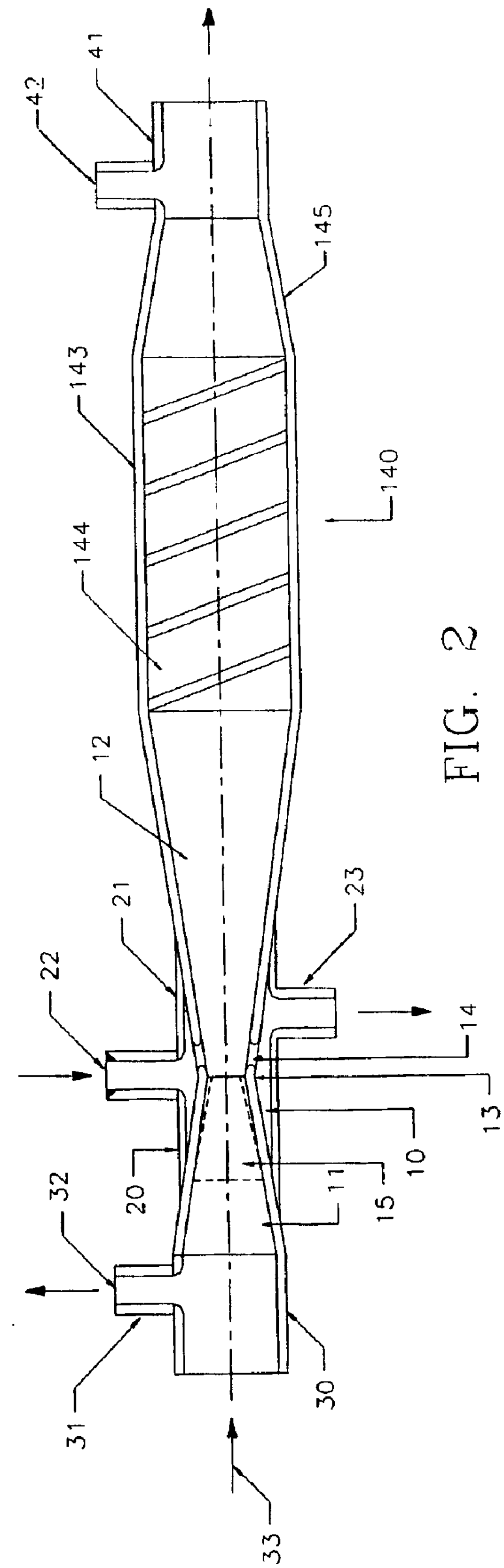
FIG. 2 is a cross-sectional view of a second embodiment of the present invention showing a cylindrical portion with a spiral mixer downstream of the venturi nozzle.

A second embodiment of the invention is shown in FIG. 2. For the various embodiments disclosed herein, the same reference numerals are used for the same or substantially similar features. Hence, the venturi nozzle 10, air inlet chamber 20, and the carrier fluid inlet 30 are in essence the same as those shown and described in the FIG. 1 embodiment. However in this embodiment, the fluid/air mixture outlet 140 incorporates a longitudinally extended cylindrical section 143 adjacent the downstream end of the venturi's outlet portion 12. The cylindrical section 143 is of a larger diameter than the outlet portion 41, and contains a spiral mixer 144 for additional mixing of air or fluid with the carrier fluid. A conically shaped constricting portion 145 is located intermediate the cylindrical section 143 and the smaller cylindrical outlet portion 41, which also has an optional radial port 42 for instrument or flushing connection.

Figure 3:
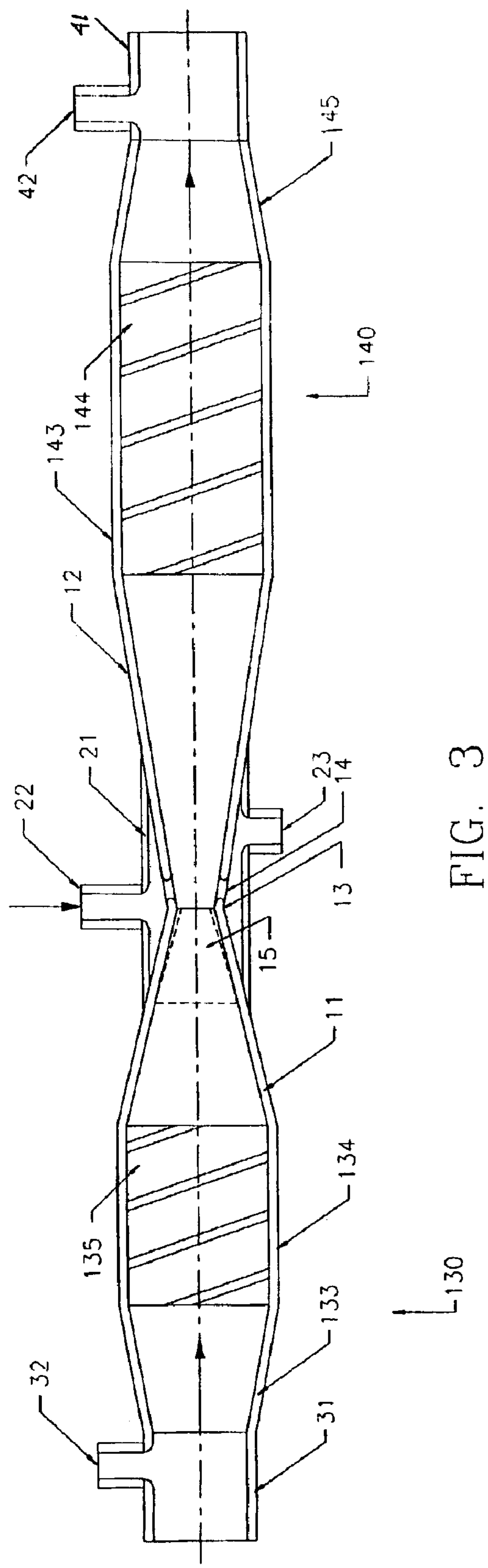
FIG. 3 is a cross-sectional view of a third embodiment of the present invention showing cylindrical portions with spiral mixers located both upstream and downstream of the venturi nozzle.

In a third embodiment of the invention is shown on FIG. 3, the carrier fluid inlet 130 has a cylindrical inlet portion 31 with an optional radial outlet port 32 for an instrument or flushing connection to the air inlet port 22 as in the prior two embodiments. In this third embodiment the downstream end of the inlet portion 31 further has a conical expanding portion 133. An elongate cylindrical intermediate section 134 is located between the downstream end of the expanding portion 133 and the upstream end of the venturi's inlet portion 11. The intermediate section 134 is of a larger diameter than the inlet portion 31, and contains a spiral mixer 135 for initiating a twisting (rotating) motion of the carrier fluid at the air inlet ports 14 to promote the initial mixing of air or fluid with the carrier fluid.

The spiral mixers 144 & 135 may be of different design and size such as standard pitch, long or short pitch, variable pitch, double pitch, tapered spiral short and long spiral sections, to suit the operating conditions and performance parameters required in a particular application.

In use, in the first embodiment the carrier fluid enters the device at the inlet portion 31. The carrier fluid velocity increases as it flows downstream into the venturi's constricting inlet portion 11 and the carrier fluid velocity reaches its maximum level at the venturi throat 13. As the carrier fluid velocity increases, there is a decrease in the carrier fluid internal pressure and the pressure becomes negative at the venturi throat 11. The negative pressure in the carrier fluid at the venturi throat 11 causes aspiration of air (gas) or other suitable fluid through the air inlet port 22 and the air inlet aperture 14 into the venturi expanding outlet portion 12. As the carrier fluid flow through the venturi expanding portion 12 is turbulent, as it changes its direction and velocity, the carrier fluid mixes with the aspirated medium. The mixture of the carrier fluid and the aspirated medium continues to flow and mix in the outlet portion 41.

In the second embodiment the carrier fluid and the aspirated medium enter the device and mix inside the venturi expanding outlet portion 12 in the same way as in the first embodiment outlined above. As the mixture of the carrier fluid and the aspirated medium leaves the venturi expanding outlet portion 12, it enters the outlet 140 which incorporates the spiral mixer 144. The spiral mixer 144 enhances the mixing of the carrier fluid and the aspirated medium, due to its "centrifuge like" action. The mixing action is further enhanced as the mixture enters the constricting outlet portion 145 due to the changes in the mixture velocity and the direction of flow. The mixture then enters the cylindrical outlet portion 41 at a higher velocity which further promotes the mixing action. Finally, the mixed fluid leaves the cylindrical outlet portion 41 and it enters process piping or other vessel.

In the third embodiment the carrier fluid enters the cylindrical inlet portion 31 and then the fluid continues to flow into the conical expanding portion 133 and then into the elongate cylindrical intermediate section 134 which incorporates a spiral mixer 135. The carrier fluid flow through the spiral mixer 135 is subjected to a twisting and rotational action which promotes the carrier fluid mixing with the aspirated medium at the venturi expanding outlet portion 12 as in the second embodiments outlined above. The carrier fluid and the aspirated medium mixture continues to flow and mix downstream in the outlet 140 as in the second embodiment outlined above.

An advantage of the device is the marked reduction, or avoidance, of clogging of the device which is attributable to the non-obstructive and large size design of the venturi nozzle 10, the close location of the air inlet apertures 14 to the nozzle throat 13, the relatively large size of the air inlet apertures 14, and the rounded edges and even circumferential spacing of the air inlet apertures 14. Further, the provision of the removable liner 15 avoids premature wearing out of the venturi's inlet portion 11 and the nozzle throat 13, and thus avoids the accumulation of solids in these areas which typically plug the venturi due to wear. The provision of the flushing connection 23 in the air inlet chamber 20 facilitates removal of any suspended solids which may accumulate in the air inlet chamber, particularly during no flow or low flow operating conditions.

As will now be appreciated, the device has applications to domestic sewage, industrial wastewater and animal manure, and related sludges and surface and groundwater treatment by means of aeration. The device has also application to mixing of manure, sewage, wastewater and sludges in anaerobic treatment by means of the bio-gas produced in the process of the liquid treatment.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below.

I claim:

1. An apparatus for aspirating and mixing an aspirated medium and a carrier fluid comprising:

a venturi having a constricting inlet portion for receiving said carrier fluid, an expanding outlet portion and a throat therebetween;

means for introducing said aspirated medium into said venturi;

a carrier fluid inlet located upstream of said venturi inlet portion having a spiral mixer to impart a twisting and rotational action to said carrier fluid prior to entering said venturi, wherein said carrier fluid inlet comprises:

a cylindrical inlet portion;

a cylindrical intermediate section adjacent said constricting inlet portion of said venturi, being of larger diameter than said cylindrical inlet portion; and, a conical expanding portion between said cylindrical inlet portion and said cylindrical intermediate section.

2. The apparatus of claim 1 wherein said spiral mixer is adapted to be housed within said larger diameter cylindrical intermediate section of said carrier fluid inlet.

3. An apparatus for aspirating and mixing an aspirated medium and a carrier fluid comprising:

a venturi having a constricting inlet portion for receiving said carrier fluid, an expanding outlet portion and a throat therebetween;

means for introducing said aspirated medium into said venturi;

a carrier fluid inlet located upstream of said venturi inlet portion having a spiral mixer to impart a twisting and rotational action to said carrier fluid prior to entering said venturi and an outlet port for an instrument or flushing connection to said means for introducing said aspirated medium into said venturi.

4. An apparatus for aspirating and mixing an aspirated medium and a carrier fluid comprising:

a venturi having a constricting inlet portion for receiving said carrier fluid, an expanding outlet portion and a throat therebetween;

means for introducing said aspirated medium into said venturi;

a carrier fluid inlet located upstream of said venturi inlet portion having a spiral mixer to impart a twisting and rotational action to said carrier fluid prior to entering said venturi; and, a conical liner removably receivable in said constricting inlet portion for varying the size of opening of said throat and for reducing wear of said venturi.

5. An apparatus for aspirating and mixing an aspirated medium and a carrier fluid comprising:

a venturi having a constricting inlet portion for receiving said carrier fluid, an expanding outlet portion and a throat therebetween;

means for introducing said aspirated medium into said venturi;

a carrier fluid outlet located downstream of said venturi outlet portion having a spiral mixer to impart additional mixing of said aspirated medium and carrier fluid exiting said venturi, wherein said carrier fluid outlet comprises:

a cylindrical outlet portion;

a cylindrical intermediate section adjacent said expanding outlet portion of said venturi, being of larger diameter than said cylindrical outlet portion; and a conical constricting portion between said cylindrical outlet portion and said cylindrical intermediate section.

6. The apparatus of claim 5 wherein said spiral mixer is adapted to be housed within said larger diameter cylindrical intermediate section of said carrier fluid outlet.

7. The apparatus of claim 5 wherein said carrier fluid outlet includes a port for connection of an instrument or drain valve.

8. An apparatus for aspirating and mixing an aspirated medium and a carrier fluid comprising:

a venturi having a constricting inlet portion for receiving said carrier fluid, an expanding outlet portion and a throat therebetween;

means for introducing said aspirated medium into said venturi;

a carrier fluid outlet located downstream of said venturi outlet portion having a spiral mixer to impart additional mixing of said aspirated medium and carrier fluid exiting said venturi; and, a carrier fluid inlet located upstream of said venturi inlet portion having a second spiral mixer to impart a twisting and rotational action to said carrier fluid prior to entering said venturi.

9. The apparatus of claim 8 wherein said carrier fluid inlet comprises:

a cylindrical inlet portion;

a cylindrical intermediate section adjacent said constricting inlet portion of said venturi, being of larger diameter than said cylindrical inlet portion; and, a conical expanding portion between said cylindrical inlet portion and said cylindrical intermediate section.

10. The apparatus of claim 9 wherein said second spiral mixer is adapted to be housed within said larger diameter cylindrical intermediate section of said carrier fluid inlet.

11. The apparatus of claim 8 wherein said carrier fluid inlet includes an outlet port for an instrument or flushing connection to said means for introducing said aspirated medium into said venturi.

12. An apparatus for aspirating and mixing an aspirated medium and a carrier fluid comprising:

a venturi having a constricting inlet portion for receiving said carrier fluid, an expanding outlet portion and a throat therebetween;

means for introducing said aspirated medium into said venturi;

a carrier fluid outlet located downstream of said venturi outlet portion having a spiral mixer to impart additional mixing of said aspirated medium and carrier fluid exiting said venturi; and, a conical liner removably receivable in said constricting inlet portion for varying the size of opening of said throat and for reducing wear of said venturi.

13. An apparatus for aspirating and mixing an aspirated medium and a carrier fluid comprising:

a venturi for aspirating said aspirated medium with said carrier fluid;

means for introducing said aspirated medium into said venturi;

a carrier fluid inlet located upstream of said venturi for receiving said carrier fluid; and, an outlet port in fluid communication with said carrier fluid inlet for an instrument or flushing connection to said means for introducing said aspirated medium into said venturi.

14. The apparatus of claim 13 wherein said carrier fluid inlet has a spiral mixer to impart a twisting and rotational action to said carrier fluid prior to entering said venturi.

15. The apparatus of claim 14 wherein said carrier fluid inlet comprises:

a cylindrical inlet portion;

a cylindrical intermediate section adjacent said venturi for housing said spiral mixer, being of larger diameter than said cylindrical inlet portion; and, a conical expanding portion between said cylindrical inlet portion and said cylindrical intermediate section.

16. The apparatus of claim 13 further including a conical liner removably receivable in said venturi for varying the size of opening of said venturi and for reducing wear of said venturi.

17. An apparatus for aspirating and mixing an aspirated medium and a carrier fluid comprising:

a venturi for aspirating said aspirated medium with said carrier fluid, said venturi having a constricting inlet portion for receiving said carrier fluid, an expanding outlet portion and a throat defining an opening therebetween; and, means for introducing said aspirated medium into said carrier fluid passing through said venturi and for introducing a flushing medium comprising:

a plurality of apertures circumferentially spaced about said expanding outlet portion immediately downstream of said throat; and, an inlet chamber surrounding a longitudinal extent of said venturi to at least enclose said apertures, said inlet chamber including:

an inlet port for selectively receiving said aspirated medium or said flushing medium to flush said inlet chamber of any suspended solids; and, an outlet port for discharging said flushing medium and suspended solids; and a conical liner removably receivable in said constricting inlet portion, said liner including means for reducing wear of said venturi and means for varying said opening at said throat to provide said apparatus with an expanded operating range.

18. The apparatus of claim 17 wherein said means for reducing wear comprises a continuous conical linear wall lacking apertures.

19. The apparatus of claim 17 wherein said means for varying said opening at said throat comprises said smaller opening being adapted for location adjacent said throat, wherein the size of said smaller opening defines said opening at said throat.

20. The apparatus of claim 18 wherein said means for varying said opening at said throat comprises said smaller opening being adapted for location adjacent said throat, wherein the size of said smaller opening defines said opening at said throat.

* * * * *